United States Patent [19]
Anderson

[11] 3,914,386
[45] Oct. 21, 1975

[54] REDUCTION OF FOAMING IN AMMONIA RECOVERY SYSTEM OF A HCN MANUFACTURING PROCESS

[75] Inventor: Thomas Jon Anderson, Victoria, Tex.

[73] Assignee: E. I. Du Pont de Nemours and Company, Wilmington, Del.

[22] Filed: July 30, 1974

[21] Appl. No.: 493,095

[52] U.S. Cl. .................. 423/376; 423/236; 423/238
[51] Int. Cl.² .................. B01D 53/34; C01C 3/02
[58] Field of Search ........... 423/210, 236, 238, 376, 423/659

[56] References Cited
UNITED STATES PATENTS

| | | | |
|---|---|---|---|
| 2,797,148 | 6/1957 | Carlson | 423/238 X |
| 3,718,731 | 2/1973 | Carlson et al. | 423/236 X |

Primary Examiner—Earl C. Thomas

[57] ABSTRACT

A process for reducing the foaming in phosphate solutions from ammonia absorbers and strippers in the process for preparing hydrogen cyanide by reacting methane, ammonia and air over a platinum catalyst.

4 Claims, No Drawings

REDUCTION OF FOAMING IN AMMONIA RECOVERY SYSTEM OF A HCN MANUFACTURING PROCESS

BACKGROUND OF THE INVENTION

1. Field of the Invention

This invention relates to an improved process for the preparation of HCN from ammonia, natural gas and air which involves reducing the foaming in the ammonia stripping operation. More specifically this invention relates to contacting with activated carbon phosphate solutions from the ammonia absorber steps of the process for the preparation of HCN from ammonia, natural gas and air.

2. Description of the Prior Art

In the Andrussow process of preparing hydrogen cyanide from the reaction of methane, ammonia and air over a platinum catalyst it is known to contact the reaction product with a monoammonium phosphate solution to absorb ammonia. This absorption of ammonia converts the monoammium phosphate solution to the diammonium phosphate. The diammonium phosphate solution is then subjected to a stripping operation wherein ammonia is removed and the solution is converted to the monoammonium phosphate. The diammonium phosphate during ammonia stripping as well as the monoammonium phosphate solution for absorption exhibit foaming which can cause liquid carryover and/or foamover of the ammonia absorber and stripper, and contamination of products involved.

SUMMARY OF THE INVENTION

Now a process has been found whereby foaming of the phosphate solution is reduced.

Accordingly, it has been found that in the process of preparing hydrogen cyanide from the reaction of methane, ammonia and air over a platinum catalyst wherein the reaction product thereof is contacted with an ammonium phosphate solution and said phosphate solution is stripped of hydrogen cyanide and ammonia and recycled, an improvement in said process comprising contacting the ammonium phosphate solution with activated carbon wherein the carbon-to-solution weight ratio is 1:4000 or greater, and separating the solution from the activated carbon. The solution may then be recycled. The preferred weight ratio from the standpoint of convenience is from 1:2039 to 1:9 of carbon-to-solution. The aqueous ammonium phosphate stream treated by the process of the present invention contains HCN polymer which is believed to be the cause of the foaming. The aqueous ammonium phosphate stream generally has a pH of 5.2 to 6.6 and a $NH_3/PO_4$ ratio of 1.3 to 1.6.

The activated carbon required for the process of the invention includes any form of carbon that is characterized by high adsorption capacity. Representative examples of commercially available activated carbon include "SCL" 8 × 30 mesh manufactured by Pittsburgh Activated Carbon Co. and "Darco G-60" manufactured by Atlas Chemical Industries, Inc. The physical properties of "SGL" 8 × 30 mesh activated carbon are:

| | |
|---|---|
| Total Surface Area (N₂BET Method*), m2/g, | 950–1050 |
| Apparent Density (Bulk Density, dense packing), g/cc | 0.48 |
| lb/ft³ | 30.0 |
| Particle Density (Hg Displacement), g/cc | 0.75 |
| Real Density (He Displacement), g/cc | 2.1 |
| Pore Volume (Within Particle), cc/g | 0.85 |
| Voids in Dense Packed Column, % | 36 |
| Specific Heat at 100°C. | 0.25 |

*J. Am. Chem. Soc.

The activated carbon may be in the form of a fine powder or in granular form or larger form and is conveniently arranged in a fixed bed for contacting the phosphate solutions of the present invention.

The process of the present invention can be batchwise although for economic reasons a continuous operation is preferred.

In the process of preparing HCN from the reaction of methane, ammonia and air over a platinum catalyst, the reaction product in the form of a gaseous mixture is scrubbed in an ammonia absorber with an aqueous ammonium dihydrogen phosphate solution. The ammonium dihydrogen phosphate absorbs ammonia and hydrogen cyanide and is itself converted to diammonium hydrogen phosphate. The diammonium hydrogen phosphate solution from the ammonia absorber is stripped in a HCN-phosphate stripper of hydrogen cyanide and then is an ammonia stripper for ammonia removal. The phosphate solution in the ammonia stripper is converted to the ammonium dihydrogen phosphate and recycled back to the ammonia absorber column.

Foaming was measured after first removing any suspended carbon by passing the phosphate solution through filter paper. The filter paper used was shown to be inert by passing a sample of diammonium hydrogen phosphate solution from the ammonia stripper of a commercial hydrogen cyanide process through said filter paper. The diammonium phosphate solution did not show any reduction in foam persistence. The simple foam test of the examples 1–5 and 7 referred to herein as foam persistence was conducted by timing the interval required for the foam to collapse to within ¼ inch of the vial wall after a 60 ml. vial containing about 30 ml of test solution was shaken vigorously for five seconds. In example 6, foam persistence was the time required for complete foam disapperance. Thus gross changes in foam persistence can be detected.

The amount of activated carbon required to reduce foaming was found to cover a wide range and depends on the amount of foaming agent to be removed, the capacity of the carbon for removal of the agent to be removed and the contact time of the carbon with the solution. For example, a weight ratio of 1:2039 of activated carbon/diammonium phosphate solution from the ammonia stripper of a HCN producing process had the foam persistence reduced from 22 seconds to 5 seconds after a contact time of 15 minutes. A weight ratio of about 1:9 of activated carbon/said diammonium phosphate solution resulted in a foam persistence of less than one second after a contact time of 15 minutes. The process of the present invention involves the use of at least a ratio of 1:4000 of activated carbon to the monoammonium phosphate or the diammonium phosphate solution. The contact time may vary from a few seconds at greater amounts of carbon-to-solution ratios to several minutes at lower amounts of carbon to solution. The preferred ratio of carbon-to-phosphate solution is 1:9 to 1:2039. The preferred contact time is greater than or equal to 15 minutes. However, the contact time is not critical at higher levels of carbon to solution.

The temperature of the process of the present invention is not critical. However, the preferred temperature is the temperature of the diammonium solution before entering the ammonia stripper.

The process of the present invention is operable at any pressure at which the diammonium phosphate solution can exist as such for contacting the activated carbon.

In the Andrussow process for the preparation of HCN wherein a monoammonium phosphate solution is used to absorb unreacted ammonia and resultant diammonium phosphate solution is subjected to stripping operations, there has been foaming encountered, both in the absorption and the stripping steps, which if not controlled will result in carryover of phosphate solution and/or foamovers. This tendency of the phosphate streams to foam increases with the length of time said phosphate streams are used. The use of the process of the present invention has prolonged the life of the phosphate streams thereby reducing costs attributable to the down time and phosphate solution themselves. In addition the tendency of the phosphate solution to foam has limited the production rates of the process involved.

The process of the present invention involves a method of reducing the foaming in phosphate solutions by treating the monoammonium phosphate solution or the diammonium phosphate solution with activated carbon as disclosed herein. Said foaming can occur whenever said phosphate solutions are subjected to sufficient agitation to produce a gas-liquid dispersion.

The invention is further illustrated by the examples that follow.

EXAMPLE 1

To a 60 ml serum vial sealed by a rubber septum stopper was added 4.7 g of "Darco G-60" activated carbon and 42.1 g of phosphate solution from a foaming ammonia stripper side stream from a commercial HCN producing process. The side stream is a diammonium phosphate solution that was contacted in the monoammonium phosphate form with gases from the converter of ammonia, natural gas and air to HCN. The mixture was shaken 5 to 6 times during a 15-minute period of contact. The mixture was filtered through "Whatman 44" filter paper and the filtrate collected in a septum sealed 60 ml. serum vial. The filtrate was tested for foaming and showed a foam persistence of less than one second.

An untreated diammonium phosphate solution from an ammonia stripper side stream was tested for foaming and showed a foam persistence of 14–15 seconds.

EXAMPLE 2

The procedure of Example 1 was repeated except that the weight ratio of activated carbon to diammonium phosphate solution was 1:2039 and the foam persistence was five seconds. An untreated sample showed a foam persistence of 22 seconds.

EXAMPLES 3–5

The procedure of Example 1 was repeated except that the weight of activated carbon to diammonium phosphate solution was varied as indicated in the table that follows to yield the foam persistence indicated.

| Ex. | Weight Carbon (g) | Weight Solution (g) | Weight Ratio of Car./Sol. | Foam Persistence (Sec.) |
|---|---|---|---|---|
| 3 | 0.0511 | 23.4 | 1:459 | ~5 |
| 4 | 0.10 | 22.6 | 1:226 | ~3 |
| 5 | 0.25 | 20.6 | 1:80 | <2 |

In order to prevent possible contamination by unwanted surface active agents, vials used on the above examples to mix the samples and to conduct the foam test were cleaned with chromic acid cleaning solution. Only new septa were used and they were washed with deionized water before use.

The process of the present invention is operable as a batchwise or a continuous operation. A fixed bed of activated carbon may be used and all or a portion of the recirculating phosphate solution passed through it. When the foaming reaches an unacceptable level in the ammonia stripper a fresh activated carbon bed may be switched to while the initial bed is emptied and refilled with fresh activated carbon.

EXAMPLE 6

A 60 ml serum vial was sealed with a rubber septum stopper. A hypodermic needle connected to a vacuum source was inserted into the septum. Another hypodermic needle with a 10 cc syringe barrel connected was inserted into the septum. The syringe barrel contained about 1 cc of glass wool or cottom and on top of the wool or cotton about 5 cc of "Darco G-60" activated carbon. Any liquid added to the syring would pass through the carbon and through the wool or cotton before entering the 60 ml serum vial.

Approximately 25 ml of phosphate solution sample from a commercial HCN producing unit at the ammonia stripper was poured into the top of the hypodermic syringe barrel. The entire volume of solution passed through the syringe in about 5 seconds or less for a solution-carbon contact time of one second or less. The foam persistence value of the solution was 40–45 seconds. Repeating the foam persistence test on another portion of the same sample which was untreated gave a 45–50 second foam persistence.

EXAMPLE 7

Using the apparatus procedure described in Example 6 but using a weaker vacuum source and a more tightly packed "Darco G-60" activated carbon column amounting to 6 cc., 30 ml of a phosphate solution sample from the ammonia stripper of the same commercial unit was poured into the top of the syringe. The carbon-to-phosphate ratio was about 1:10. Filtration took about 30 minutes. The solution/carbon contact time was 6 minutes or less. The foam persistence value was 5–3seconds. An untreated portion of the sample taken gave a foam persistence of 14–15 seconds.

EXAMPLE 8

In a plant manufacturing hydrogen cyanide by the Andrussow process, converter off-gas containing hydrogen cyanide and unconverted ammonia was fed to the bottom of an ammonia absorber column 35 feet high and 12 feet in diameter whereby it contacta a descending flow of ammonium dihydrogen phosphate solution (30 weight percent phosphate as phosphoric acid). Ammonia is absorbed in the solution forming diammonium hydrogen phosphate while most of the hydrogen cyanide is taken off overhead. The small amount of hydrogen cyanide absorbed in the ammonia absorber is thermally stripped from the solution by feeding the solution to the top of a hydrogen cyanide/phosphate stripper column. The tails from the hydrogen cyanide/phosphate stripper column were then passed at a 270 gal/min flow rate through a cartridge filter vessel containing a 180 lb bed of Pittsburgh Activated Carbon's "SGL" 8 ×30 mesh activated carbon with an approximate hold-up time of 7 seconds (carbon to solution mass ratio = 1:678). Next, the treated solution was fed to the top of an ammonia stripper column in which ammonia is steam-stripped from the diammonium hydrogen phosphate solution giving ammonium dihydrogen phosphate solution. Ammonia was taken off the top of the column and the ammonium dihydrogen phosphate solution was recycled in two streams back to the ammonia absorber column.

In a plant test, the activated carbon was omitted from the filter vessel for one month. Foaming was occurring at the end of that time and was quantified by observing its height in a bulls eye located above the top plate in the ammonia absorber column. A clean filter vessel containing activated carbon as described above was then substituted for the vessel containing no carbon and the level of foam observed. The following data resulted:

| Date | Time | Estimated Height of Foam |
|---|---|---|
| 7-17-73 | 10:30 | 2.3'' |
|  | 11:30 | 2.3'' |
|  | 12:30 | 2.3'' |
|  | 13:00 | Activated carbon placed in stream |
|  | 14:00 | 0.6'' |
|  | 15:00 | 0 |
|  | 16:00 | 0 |
|  | 17:00 | 0 |
|  | 18:00 | 0 |
| 7-18-73 | 8:30 | 0 |
| 7-19-73 | 8:30 | 0 |
| 7-20-73 | 8:30 | 0 |
| 7-21-73 | 8:30 | 0 |

Prior to activated carbon treatment, the circulating ammonium phosphate solution had to be disposed of after 1–3 months of operation due to excessive foaming in the ammonia absorber and ammonia stripper columns. The useful life of the ammonium phosphate solution when treated according to the present invention is at least 7 months.

The process of the present invention, therefore, has utility as a foam-reducing treatment for phosphate streams in the production of hydrogen cyanide. The process of the invention prolongs the life of the phosphate stream and thereby reduces costs and down time as well as reducing the loss of ammonia and its attendant consumption of $H_2SO_4$ in subsequent process units. The reduced foaming that results from this invention permits increased production rates that heretofore were restricted by foaming.

The foregoing detailed description has been given for clarity of understanding and no unnecessary limitations are to be understood therefrom. The invention is not limited to exact details shown and described for obvious modications will occur to one skilled in the art.

I claim:

1. In the process of preparing hydrogen cyanide from the reaction of methane, ammonia and air over a platinum catalyst wherein the reaction product thereof is contacted with an ammonium phosphate solution and said phosphate solution is stripped of hydrogen cyanide and ammonia and then recycled, the improvement comprising contacting the phosphate solution with activated carbon at a carbon-to-phosphate solution weight ratio of 1:4000 or greater for a period and separating the solution from the activated carbon.

2. The process of claim 1 wherein the solution-to-carbon ratio is 1:9 to 1:2039.

3. The process of claim 2 wherein the phosphate solution is contacted with the activated carbon for a period of 15 minutes.

4. The process of claim 1 wherein the phosphate solution is contacted with activated carbon on a continuous basis.

* * * * *